United States Patent
Prokop et al.

[11] Patent Number: 6,145,625
[45] Date of Patent: Nov. 14, 2000

[54] GREASE LUBRICATOR, PARTICULARLY FOR CONSTRUCTION MACHINE

[75] Inventors: Heinz-Jürgen Prokop; Thomas Deimel, both of Essen; Ferdinand Zumbach, Haan, all of Germany

[73] Assignee: Krupp Bautechnik GmbH, Essen, Germany

[21] Appl. No.: 09/021,366

[22] Filed: Feb. 10, 1998

[30] Foreign Application Priority Data

Feb. 10, 1997 [DE] Germany ............ 197 04 958

[51] Int. Cl.⁷ ...................................... F16N 7/14
[52] U.S. Cl. ................ 184/27.1; 184/105.2; 417/307; 417/489
[58] Field of Search ................ 184/6.14, 6.4, 184/29, 28, 27.1, 105.1, 105.2; 417/307, 489, 570; 137/565.35

[56] References Cited

U.S. PATENT DOCUMENTS

| | | | |
|---|---|---|---|
| 3,291,350 | 12/1966 | Malec | 417/489 |
| 3,599,753 | 8/1971 | Walsh | 184/29 |
| 3,939,943 | 2/1976 | Salmi | 184/6.14 |
| 4,589,825 | 5/1986 | Schmidt | 417/307 |
| 4,738,595 | 4/1988 | Gaiser | 417/307 |
| 4,739,854 | 4/1988 | Sabel et al. | 417/307 |
| 5,060,761 | 10/1991 | Arndt et al. | 184/6.4 |
| 5,449,051 | 9/1995 | Liao | 184/6.4 |
| 5,570,868 | 11/1996 | Flaming | 184/29 |

FOREIGN PATENT DOCUMENTS

| | | |
|---|---|---|
| 0 288 981 | 11/1988 | European Pat. Off. |
| 866 746 | 2/1953 | Germany |
| 23 19 249 | 10/1974 | Germany |
| 35 12 020 | 10/1986 | Germany |

*Primary Examiner*—David A. Bucci
*Assistant Examiner*—Chong H. Kim
*Attorney, Agent, or Firm*—Venable; Gabor J. Kelemen

[57] ABSTRACT

A lubricator for delivering grease lubricant to lubricating locations of a machine is coupled to a grease container and has a work chamber in which a delivery piston reciprocates. To ensure that a compressible medium, such as air which has been drawn into the work chamber is rapidly expelled therefrom, the work chamber is divided by a grease return device into a compressing portion and a delivery portion. Triggered by a sufficiently high pressure level which prevails in the compressing portion and which is present only during grease delivery, an otherwise blocked return connection is established between the compressing portion and a supply port which couples the grease container to the work chamber, as long as the head of the delivery piston, in the course of its grease delivery stroke (forward stroke) is situated in the compressing portion.

7 Claims, 6 Drawing Sheets

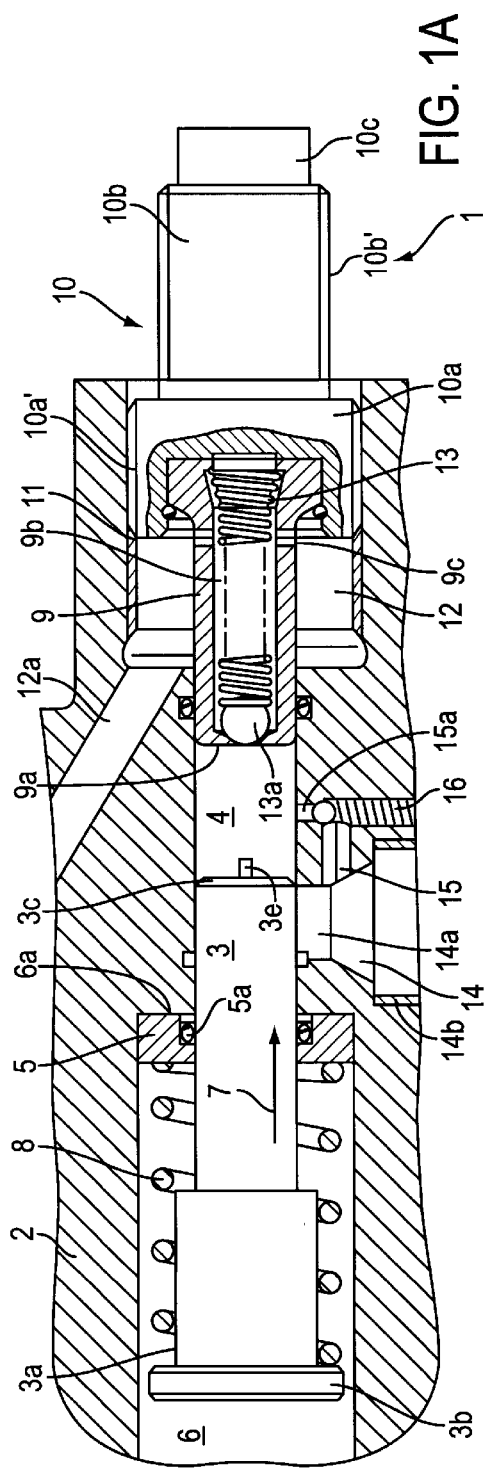

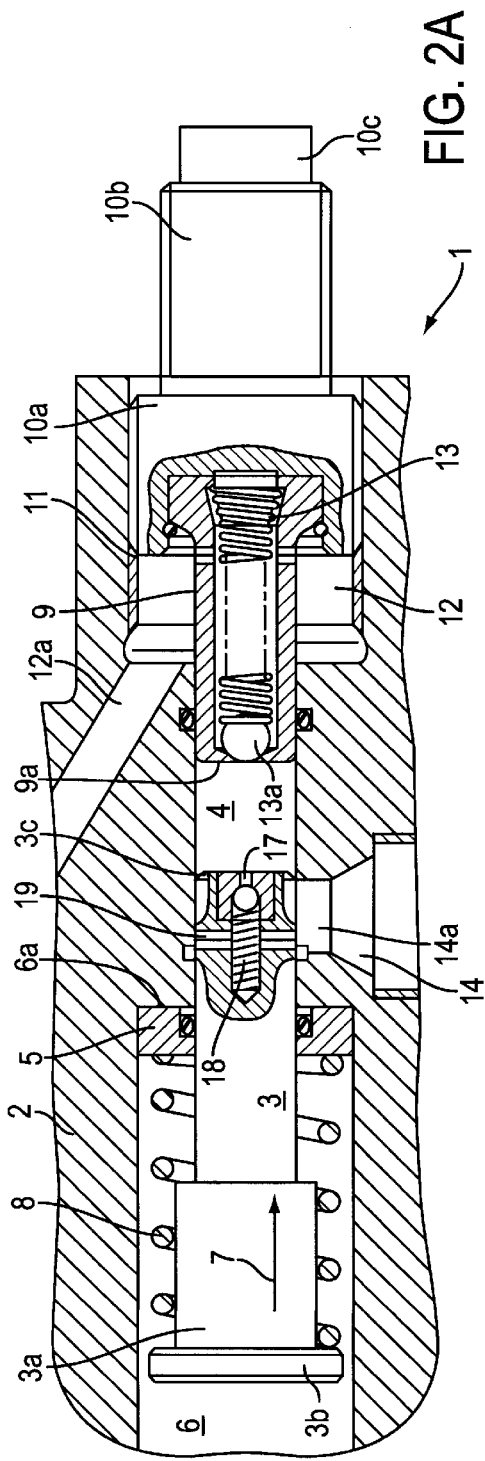
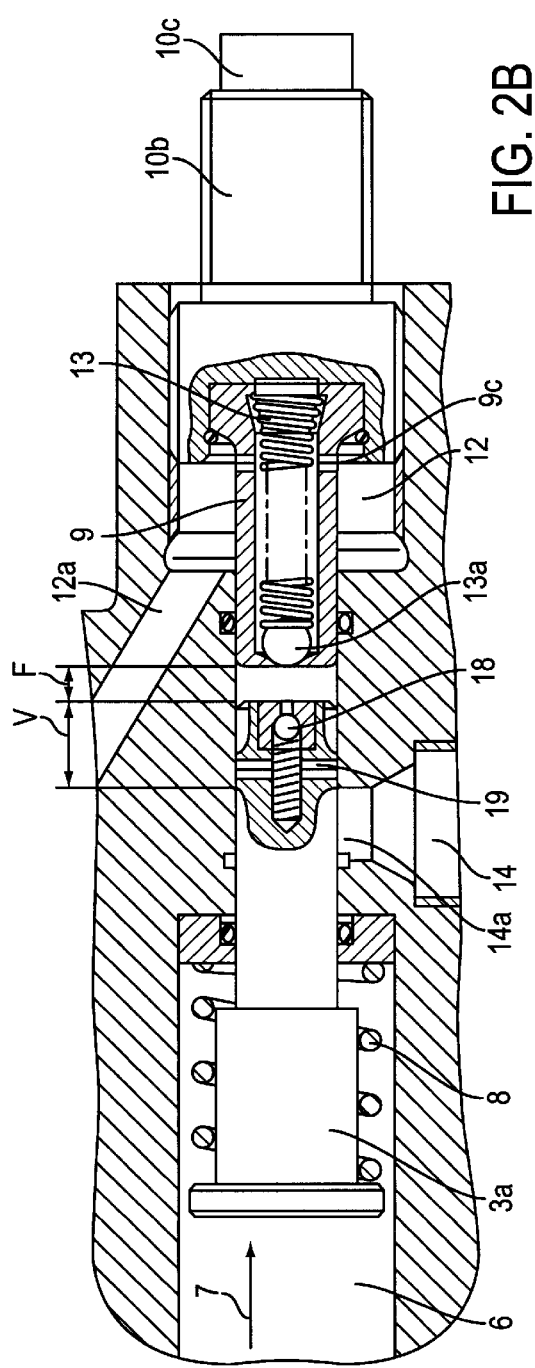
FIG. 2A
FIG. 2B

GREASE LUBRICATOR, PARTICULARLY FOR CONSTRUCTION MACHINE

CROSS REFERENCE TO RELATED APPLICATION

This application claims the priority of German Application No. 197 04 958.3 filed Feb. 10, 1997, which is incorporated herein by reference.

BACKGROUND OF THE INVENTION

This invention relates to a grease lubricator particularly for supplying lubricating grease to construction machines, such as hydraulically operated striking tools and crusher jaws. The lubricator includes a grease delivery piston which linearly reciprocates in a work chamber to execute delivery strokes and return strokes, a supply port which opens into the work chamber and which communicates with the lubricating grease container, a delivery port having a closure element yieldingly urged into a closed position and an adjusting abutment which limits the amplitude of the delivery stroke of the delivery piston. The mouth of the supply port merging into the work chamber is, as viewed in the direction of the delivery stroke, situated upstream of the mouth of the delivery port merging into the work chamber and may be at least periodically closed off from the work chamber when the delivery piston moves in the delivery direction beyond the mouth (opening) of the delivery port.

Construction machines, particularly comminuting and crushing apparatus, frequently have guiding and bearing elements which are exposed to high loads and which are lubricated with grease lubricants that expediently have a high or very high solid contents.

U.S. Pat. No. 5,060,761 describes a lubricating device of the above-outlined type, by means of which the chisel of a hydraulic striking tool is automatically lubricated. The device disclosed has a lubricant container whose contents are advanced to a delivery unit by means of a biased compression spring. The delivery unit is provided with a venting valve for eliminating occasionally present air bubbles and has a check valve in the region of its delivery port. By virtue of the check valve only a unidirectional flow is allowed in the delivery port coupled to the work chamber (delivery chamber).

To ensure a satisfactory operation of the delivery unit, any gas (such as air) that has penetrated thereinto when the grease container is replaced, has to be removed by means of the venting valve. Otherwise risks are high that the delivery unit does not convey grease over a substantial period.

SUMMARY OF THE INVENTION

It is an object of the invention to provide an improved grease lubricator which operates as a suction and pump unit and which is capable of automatically and relatively rapidly eliminating air inclusions occurring upon filling or replacing the lubricating grease container to thus ensure a continuous supply of grease to the after-connected lubricating locations.

It is a further object of the invention to ensure that the lubricator (grease delivery unit) and the grease container attached thereto, together have relatively small dimensions and thus, if required, they may be arranged in the vicinity of the lubricating locations to be served.

It is yet another object of the invention to drive the applicator with a fluid which is present in any event as a pressure medium for operating the construction machine to be lubricated.

These objects and others to become apparent as the specification progresses, are accomplished by the invention, according to which, briefly stated, the grease lubricator includes a work chamber; a delivery piston accommodated in the work chamber for executing delivery strokes and return strokes therein; a supply port connectable to a grease container and merging into the work chamber and being closable by the delivery piston during the delivery strokes thereof; a delivery port connectable to a machine location to be lubricated and merging into said work chamber downstream of the supply port as viewed in a direction of the delivery strokes; a closure element resiliently maintained in the closed position for establishing or interrupting communication between the work chamber and the delivery port; and an adjusting abutment situated at an end of the work chamber and limiting a length of the delivery strokes. The work chamber has a compressing portion situated downstream of the supply port and a delivery portion adjoining the compressing portion downstream thereof; and a grease return device for returning grease from the compressing portion into the supply port. The grease return device includes a blocking arrangement for maintaining communication between the compressing portion and the supply port solely as long as the delivery piston head is situated in the compressing portion during the delivery strokes and a sufficiently high pressure prevails in the compressing portion. A biasing arrangement resiliently maintains the closure element in the closed position and has a biasing force set such that the closure element assumes its open position at the earliest when the delivery piston head, during the delivery stroke, has reached the delivery portion of the work chamber and has blocked off the delivery portion from the compressing portion.

Thus, according to the invention, the conventional device is improved in that the work chamber of the lubricator has a compressing portion starting downstream of the opening of the supply port as viewed in the direction of the delivery stroke of the delivery piston and a delivering portion adjoining the compressing portion downstream thereof. After the delivery piston, in the course of its delivery stroke, closes the supply port opening, a compressible medium (usually air) drawn previously into the work chamber is compressed to the volume of the delivery portion and is thereafter driven into the delivery port overcoming the closing force of a closure element which is yieldingly held in the closed position.

An otherwise blocked return connection is established between the compressing portion and the supply port by an additional device (grease return device), triggered by a sufficiently high pressure level in the compression portion, present only during delivery of the lubricating grease. Such a return connection is maintained as long as the head of the delivery piston, during its delivery stroke, is situated in the compressing portion of the work chamber. Thus, in case no compressible medium is present in the work chamber, a build-up of a high pressure level occurs already in the compressing portion, as a result of which one part of the incompressible lubricating grease is returned into the supply port and only the lubricating grease present in the delivery portion is further advanced into the delivery port. The closing force of the closure element cooperating with the delivery port is set such that the closure element opens at the earliest when the head of the delivery piston has reached the delivery portion of the work chamber and has closed off the delivery portion from the compressing portion. Accordingly, the maximum quantity of the medium which may be displaced towards the delivery port after the closure element has moved into its open position is that which is enclosed between the head of the delivery piston and the adjusting abutment in the delivery portion.

The compressing portion within the work chamber is thus defined such that a return delivery towards the supply port is triggered only during grease delivery, so that the maximum quantities to be delivered for each delivery stroke of the piston is represented only by the grease volume enclosed in the delivery portion of the work chamber. The smallest length of the compressing portion as viewed in the direction of the delivery stroke of the piston corresponds normally to the longitudinal dimension (viewed parallel to the strokes of the delivery piston) of the opening of the supply port into the work chamber. The position of the compressing portion relative to the supply port opening as well as its length may be affected by particular structural measures.

To ensure that the delivery portion has a residual volume which is as small as possible after the delivery piston has reached the end of its delivery stroke, according to a further feature of the invention the opening of the delivery port is arranged in the adjusting abutment. In the simplest case the adjusting abutment has a central bore which terminates at an end face bordering the delivery portion.

According to another advantageous feature of the invention, the closure element is so designed and arranged that in the closed position it forms one part of the end face of the adjusting abutment which borders the delivery portion of the work chamber.

In the simplest case the return force (closing force) applied to the closure element is set such that after penetration of the delivery piston into the delivery portion, the closure element is moved indirectly into the open position, that is, it is displaced against the closing force by the lubricating grease or air cushion enclosed in front of the delivery piston. Thus, the delivery port is opened as soon as a sufficiently high pressure level is reached in the delivery portion.

According to another advantageous feature of the invention the closure element is opened by mechanical means as soon as the head of the delivery piston is positioned in the vicinity of the adjusting abutment. By "vicinity" there is meant in this connection a distance from the adjusting abutment which is at the most one-third of the axial length of the delivery portion. The mechanically operating opening mechanism includes a projection which is provided on the delivery piston at its face oriented towards the closure element and/or on the closure element at its side oriented towards the delivery piston. The projection, in the course of the delivery stroke of the delivery piston, engages the respective other component (the closure element or the delivery piston, as the case may be) and thus displaces the closure element in the delivery direction against its return force.

For causing the closure element to open by mechanical means, in the simplest case the closure element is designed in such a manner that in its closed position it projects into the delivery portion beyond the adjusting abutment. Accordingly, the delivery piston, during its delivery stroke, arrives into contact with the projecting closure element and shifts it into its open position before the delivery piston arrives into contact with the adjusting abutment.

The drive by means of which the delivery piston is displaced in the delivery direction or in the opposite (suction) direction may be of desired construction. In a particularly simple embodiment the delivery piston executes its delivery strokes by fluid pressure applied to the delivery piston externally of the work chamber and has a mechanical resetting means (such as a spring) acting in the reverse (suction) direction. Such an embodiment is advantageous if pressurized fluid has to be present in any event, for example, for operating the construction machine to be lubricated.

If the operational pressure of the fluid pressure medium is varied in a suitable manner, the operational mode of the lubricator may be automated as described in the earlier-noted U.S. Pat. No. 5,060,761.

The additional device—which makes possible a recirculation of one part of the lubricating grease drawn into the work chamber—may comprise a return-blocking element which is held yieldingly in the closed position and by means of which a return port opening into the work chamber at least periodically communicates with the supply port. In such an arrangement a return port opening into the work chamber communicates with the supply port if a pressure predetermined by the return-blocking element is exceeded, as long as the delivery piston, during execution of its delivery stroke, assumes a suitable position within the work chamber.

According to another advantageous feature of the invention, the return port—through which a return connection (communication) is established between the compressing portion of the work chamber and the supply port—may be situated externally of the delivery piston. In such an arrangement the opening of the return port in the work chamber determines the end of the compressing portion as viewed in the delivery direction. This arrangement operates as follows:

After the delivery piston has closed the opening of the supply port in the course of the delivery stroke, the incompressible lubricating grease drawn into the work chamber is—during the open state of the supply-blocking element—pressed into the return port until the return port opening is covered by the delivery piston as its delivery stroke continues. Thereafter, the grease quantity which is then enclosed in the delivery portion is conveyed into the delivery port after the closure element opens. The length of the compressing portion corresponds to the distance between the terminal zone of the supply port opening and the terminal zone of the return port opening. The last-named terminal zone at the same time constitutes the beginning zone of the delivery portion which, at its end, is bordered by the adjusting abutment.

Departing from the last-described embodiment, according to a further feature of the invention, the return port, together with the return-blocking element, may be integrated in the delivery piston. In such an arrangement the return port may be formed of a longitudinal (axial) bore opening into the delivery piston head and a transverse bore communicating with the longitudinal bore and exiting on that side of the circumferential face of the delivery piston which is oriented towards the opening of the supply port. In this arrangement the length of the compressing portion is composed of the length dimension of the supply port opening and the length of the transverse bore provided in the head of the delivery piston.

As soon as the transverse bore, during grease delivery by the delivery piston, has reached the starting zone of the supply port opening, the return-blocking element assumes its open position. As a result, lubricating grease is returned through the longitudinal bore and the transverse bore into the supply port. This event takes places as long as the end zone of the transverse bore coincides with the end zone of the opening of the supply port as the delivery stroke continues, and thereafter communication between the transverse bore and the supply port opening is interrupted. The last-named position of the delivery piston within the work chamber also determines the beginning of the delivery portion and thus determines the length thereof.

Contrary to the earlier-described embodiments which have a "one-part" delivery piston, according to a further advantageous feature of the invention the delivery piston may have an external piston which is disposed within the work chamber and which is axially movable relative to the delivery piston. The stroke length of the external piston is limited, on the one hand, by a holding element provided on the delivery piston and, on the other hand, by a limiting surface at which the compressing portion changes into the delivery portion of lesser diameter. The drive for both the delivery piston and the external piston is such that the compressing force applied in the delivery direction to the external piston is less than the driving force which moves the delivery piston in the same direction and is so set that the external piston may assume its terminal position at the limiting surface against the force of the compressible medium that has entered the work chamber. As a result of such a drive, first both pistons are moved in the delivery direction against the resistance of the compressible medium until the external piston engages the limiting surface and the compressible medium fills only the delivery portion in a compressed state. Thereafter the compressible medium is displaced into the delivery port as soon as the closure element (which blocks the delivery port) is moved into its open position during the continuing forward movement of the delivery piston, either under the effect of a sufficiently high pressure level or by mechanical means as described earlier. As the lubricating grease is being delivered, both pistons move in unison in the delivery direction until the external piston has blocked the opening of the supply port. Since the delivery piston thereafter continues to execute its delivery stroke because of the greater driving force applied thereto, the external piston, under the effect of the incompressible lubricant grease, is pushed back opposite the delivery direction, whereby a return communication is established with the supply port. Such a communication is maintained as long as the delivery piston, in the course of its continued forward movement, has reached the beginning of the delivery portion and closes off the latter from the upstream-located compressing portion. The lubricating grease which is at that point in the delivery portion, is subsequently—after opening of the closure element—displaced into the delivery port until the delivery piston has assumed its terminal position at the adjusting abutment.

It is an advantage of such an arrangement that the external piston which moves relatively to the delivery piston works together with the delivery piston during the compression of a compressible medium and during grease delivery automatically establishes a return communication with the supply port. Accordingly, the "two-part" piston arrangement does not depend on a separate return closure element.

According to a particularly simple embodiment of a two-part piston arrangement, the external piston is partially situated externally of the work chamber and is charged with pressurized fluid which also drives the delivery piston. In such an arrangement the piston faces charged with the pressurized fluid merely have to be of different size to establish the required driving forces.

The closure elements—that is, the closure element for the delivery port or the return closure element—may be of desired configuration; preferably, they include a spring biased check valve.

Expediently, the closure element cooperating with the delivery port directly forms a part of the wall of the delivery portion upstream of the delivery port in such a manner that the delivery portion at least approximately has a "zero" volume when the delivery piston engages the adjusting abutment which limits its forward motion in the work chamber. Thus, in such an arrangement the closure element is designed and adapted to the adjusting abutment such that between the end face of the adjusting abutment bordering the delivery portion and the closure element proper no depressions, openings, gaps or the like are present when the closure element assumes its closed position.

The adjusting abutment—by means of which the volume of the delivery portion and thus the delivered grease quantity may be altered—may be provided, in a manner known by itself, with a threaded pin which is supported by means of an inner thread provided in the structural element defining the work chamber. By rotating the threaded pin, the position of the adjusting abutment may be changed relative to the work chamber in either direction parallel to the motion of the delivery piston.

BRIEF DESCRIPTION OF THE DRAWINGS

FIG. 1a is an axial sectional view of a preferred embodiment of the invention showing the return port externally of the delivery piston and illustrating the structure in a first operational position.

FIG. 1b is a view similar to FIG. 1a illustrating the structure in a second operational position.

FIG. 2a is an axial sectional view of another preferred embodiment of the invention showing the return port within the delivery piston and illustrating the structure in a first operational position.

FIG. 2b is a view similar to FIG. 2a illustrating the structure in a second operational position.

DESCRIPTION OF THE PREFERRED EMBODIMENTS

Figure 3:
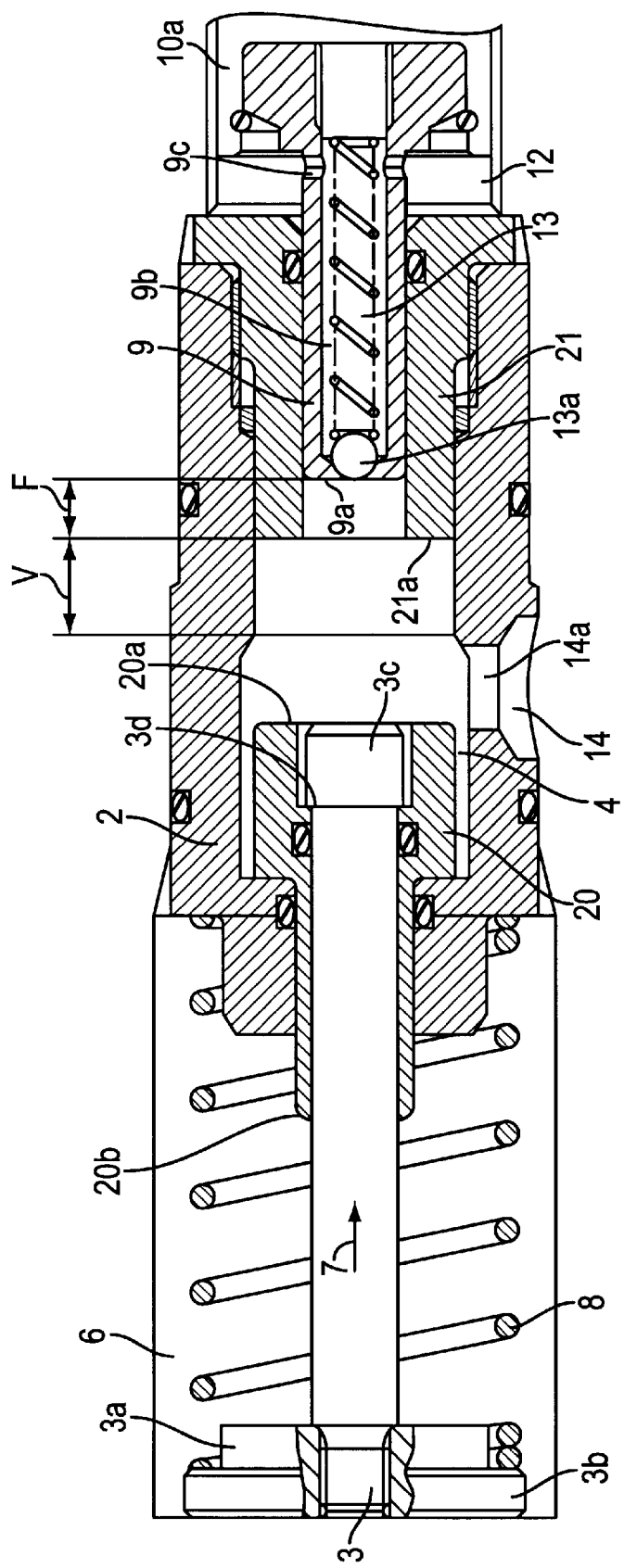
FIG. 3 is an axial sectional view of yet another preferred embodiment in which the delivery piston is provided with an external piston.

Turning to FIGS. 1a and 1b, the lubricator (delivery unit) generally designated at 1 which forms the principal component of the lubricating grease supply apparatus includes a lubricator housing 2 and a linearly reciprocating delivery piston 3 arranged for linear reciprocation in a work chamber 4 defined within the delivery housing 2. The delivery piston 3 projects into an additional work chamber 6 which is larger than the work chamber 4. The delivery piston 3 traverses from the work chamber 4 into the additional work chamber 6 through a sealing passage formed by a sealing disc 5 which engages the base 6a of the additional work chamber 6 and which accommodates a sealing ring 5a slidingly engaging the delivery piston 3. The delivery piston 3 has a terminal guide portion 3a provided with a closure plate 3b. The components 3a and 3b are arranged in the additional work chamber 6 which may be charged in a known manner with a pressurized fluid through a non-illustrated pressure line, as a result of which a driving force is applied to the delivery piston 3. Such driving force acts in the delivery direction indicated by the arrow 7. In the illustrated embodiment the delivery piston 3 is provided with a mechanical resetting means constituted by a biased coil spring 8 which is disposed in the additional work chamber 6 and which engages the closure plate 3b at one spring end and the sealing plate 5 at the other spring end. When the additional work chamber 6 is depressurized, under the effect of the coil spring 8 the delivery piston 3 executes a return motion (suction stroke) towards the left, opposite the delivery direction 7.

As viewed in the direction of the delivery stroke (arrow 7), the work chamber 4 is terminated by an end face 9a of a sleeve-like adjusting abutment 9 which is attached to an adjusting pin 10 at its side opposite the end face 9a. The adjusting pin 10 has, as viewed in the direction indicated by the arrow 7, a hollow adjusting portion 10a accommodating an end portion of the adjusting abutment 9 and provided with an external thread 10a', a securing portion 10b provided with an external thread 10b' and a rectangular portion 10c which may be engaged and turned by a suitable tool. The thread 10a' meshes with an inner thread 11 of the lubricator housing 2. The thread 11 forms a portion of a delivery port 12. The securing portion 10b situated essentially externally of the lubricator housing 2 serves to immobilize the adjusting pin 10 by a non-illustrated securing nut held on the thread 10b' to secure the adjusting pin 10 against undesired shifting. By rotating the adjusting pin 10 relative to the housing 2, the adjusting abutment 9 may be axially displaced, as a result of which the position of the end face 9a also changes relative to the work chamber 4.

The adjusting abutment 9 has, in its longitudinal (axial) bore 9b, a closure element constituted by a spring biased check valve 13 composed of a valve ball 13a and a compression spring 13b urging the valve ball 13a into its closed position into a valve seat bore provided in the end face 9a of the adjusting abutment 9. In the illustrated closed position the check valve 13 blocks communication between the work chamber 4 and the axial bore 9b. The latter is in communication by means of several outlet ports 9c with the delivery port 12 whose extension 12a exits the lubricator housing 2 and supplies grease to the lubricating locations to be served by the lubricator 1.

The lubricator housing 2 further has a supply port 14 merging into the work chamber 4 by means of a supply port opening 14a which is situated between the base 6a of the additional work chamber 6 and the end face 9a of the adjusting abutment 9. A coupling thread 14b of the supply port 14 may establish a releasable connection between the supply port 14 and a grease container shown, for example, in FIG. 6 and designated at 22.

The supply port 14 is connected with a return port 15 controlled by a spring biased check valve 16 which, during normal operation, assumes the illustrated closed position and may be shifted into an open position in case the pressure prevailing in the work chamber 4 exceeds a predetermined limit value. The opening 15a of the return port 15 merges into the work chamber 4 by means of a return port opening 15a which is situated between the supply port opening 14a and the end face 9a of the adjusting abutment 9. Such a construction and arrangement of the return port 15 divides the work chamber 4 into a compressing portion V and an adjoining delivery portion F as shown in FIG. 1b. The length of the compressing portion V corresponds approximately to the distance between the ends (viewed in the direction of the arrow 7) of the openings 14a and 15a, whereas the length of the delivery portion F corresponds approximately to the distance between the end (viewed in the direction of the arrow 7) of the opening 15a and the end face 9a. The check valve 13 is designed such that the surface portion of the valve ball 13a oriented towards the delivery piston 3 lies at least approximately in the plane of the end face 9a.

Independently of whether a compressible medium (normally air) or an incompressible medium (grease) has been drawn into the work chamber 4, the closing forces of the check valves 16 and 13 are coordinated with one another such that the check valve 16 (which serves as the return closure element) is moved into its open position by a lower pressure than the check valve 13 (associated with the delivery port 12). Furthermore, the closing force of the check valve 16 is designed such that it always assumes a closed position upon delivery of a compressible medium. As a result, the compressible medium drawn into the work chamber 4 may be displaced outwardly exclusively through the axial bore 9b and the delivery port 12, 12a after the opening of the check valve 13 in response to a sufficiently high pressure level.

In the alternative, the opening of the check valve 13 may be effected by mechanical means, for example, by a projection 3e which is provided on the delivery piston 3 and which extends toward the valve ball 13a and/or by a non-illustrated projection which is provided on the valve ball 13a and which extends toward the delivery piston 3. By means of the projection or projections the delivery piston 3, during the course of its delivery stroke within the delivery portion F, engages the valve ball 13a and as the delivery stroke continues, it mechanically moves the valve ball 13a into its open position.

The embodiment according to FIGS. 1a and 1b operates as follows:

If by the suction motion of the delivery piston 3 executed opposite the direction indicated by the arrow 7 air is drawn from the supply port 14 into the work chamber 4, during the subsequent forward motion (delivery stroke) of the delivery piston 3 in the direction 7, the piston head 3c first closes the supply port opening 14a and thereafter, upon continued closed state of the check valve 16, the air volume enclosed in the work chamber portions V and F is compressed until the delivery piston 3 has completely covered the return port opening 15a and thus has blocked off the return port 15 from the work chamber 4, as shown in FIG. 1b.

The air at that time fills only the delivery portion F and is compressed to a pressure which, upon continued forward movement of the delivery piston 3, is sufficient to open the check valve 13 and to thus displace the air through the bores 9b and 9c into the delivery port 12. Such an air delivery process continues until the head 3c of the delivery piston 3 has engaged the end face 9a and thus the delivery portion F has been reduced at least approximately to a zero volume. Accordingly, the lubricator 1 is adapted to expel from the work chamber 4 any compressible medium that has been drawn thereinto. As it has been discussed earlier, the check valve 13—when the delivery piston 3 and/or the check valve 13 are suitably designed—may be moved mechanically into the open position.

In case incompressible lubricating grease is drawn into the work chamber 4 as a result of the return motion (suction stroke) of the delivery piston 3, this results, upon closing of the opening 14a by the delivery piston 3 (FIG. 1a) during its continued delivery stroke, in a sufficiently high pressure level build-up in the portions V and F for opening the check valve 16, so that, corresponding to the piston motion, grease may be displaced into the return port 15 and the supply port 14. Grease return through the return port 15 proceeds until the delivery piston 3 (as shown in FIG. 1b) also closes the return port opening 15a. A further forward motion of the delivery piston 3 results in the opening of the check valve 13 and, as a result, the grease quantity occupying the delivery portion F is being displaced in the direction of the delivery port 12 until the delivery piston enters into engagement with the end face 9a.

In both operational cases, that is, upon delivery of a compressible medium and upon delivery of incompressible grease, the delivery portion F contains the maximum deliverable volume after the opening 15a is closed by the delivery piston 3. Upon the delivery of a compressible medium, the latter is merely compressed as the piston 3 passes through the compressing portion V. In contrast, the compressing portion V serves, in case of grease delivery, to expel grease corresponding to the volume of the compressing portion V until the piston, during its delivery stroke, has blocked the opening 15a of the return port 15.

In the embodiment according to FIGS. 2a and 2b the return port is, together with the return closure element, integrated in the delivery piston 3. The return port is composed of an axial bore 17 opening into the head 3c of the delivery piston 3 and a transverse bore 19 which communicates with the axial bore 17 and which exits the peripheral surface of the delivery piston 3 at that side which is oriented towards the supply port opening 14a. The axial bore 17 is controlled by a spring biased check valve 18. The length of the compressing portion V corresponds to the distance between the front wall part of the transverse bore 19 and the frontal end face of the cylinder head 3c as seen in the delivery direction 7. The length of the delivery portion F in the delivery direction (FIG. 2b) corresponds to the distance between the frontal end face of the cylinder head 3c and the end face 9a of the adjusting abutment 9 after the delivery piston 3 has reached a position in which communication between the opening 14a and the transverse bore 19 is interrupted, that is, the delivery piston 3 blocks the opening 14a of the supply port 14. In other aspects the construction shown in FIGS. 2a and 2b operates, when delivering a compressible medium or when delivering grease, in the same manner as described in connection with the embodiment illustrated in FIGS. 1a and 1b.

In the embodiment according to FIG. 3, the delivery piston 3 is provided within the work chamber 4 with an external piston 20 which may move axially relatively to the delivery piston 3 and whose play is limited, on the one hand, by a shoulder 3d of the delivery piston 3 and, on the other hand, by a surface 21a which separates the compressing portion V from the delivery portion F. The latter has a smaller diameter than the compressing portion V. The surface 21a forms the end face of a sleeve-like insert 21 which is secured to the lubricator housing 2 and into which the adjusting abutment 9 extends. The end face 21a of the insert sleeve 21 is oriented towards the pistons 3 and 20. The length of the delivery portion F corresponds to the distance between the surface 21a of the insert sleeve 21 and the end face 9a of the adjusting abutment 9. The length of the compressing portion V is determined, on the one hand, by the position of the surface 21a and, on the other hand, by the position which the end face 20a of the external piston 20 assumes after the latter, during its motion in the delivery direction 7, has just blocked off the opening 14a of the supply port 14 from the work chamber 4. The drive-side end face 20b of the external piston 20 projects into the additional work chamber 6 in the illustrated starting position and may be charged there with a fluid pressure medium similarly to the delivery piston 3 for displacement in the delivery direction 7. Accordingly, the external piston 20 needs no separate, individual drive unit.

As further shown in FIG. 3, the "two-part" piston arrangement has no separate return port in addition to the return closure element; the function of such return port is taken over simultaneously by the external piston 20. In case the delivery piston 3, after depressurization of the additional work chamber 6, moves in the suction direction (that is, in a direction opposite the arrow 7) under the effect of the coil spring 8, the external piston 20 is, by virtue of its engagement with the surface 3d, moved in unison with the delivery piston 3 in such a direction until it has reached the illustrated starting position.

The mode of operation of the embodiment illustrated in FIG. 3 for delivering a compressible medium (air delivery) is discussed below in conjunction with FIGS. 4a–4d.

Figure 4A:
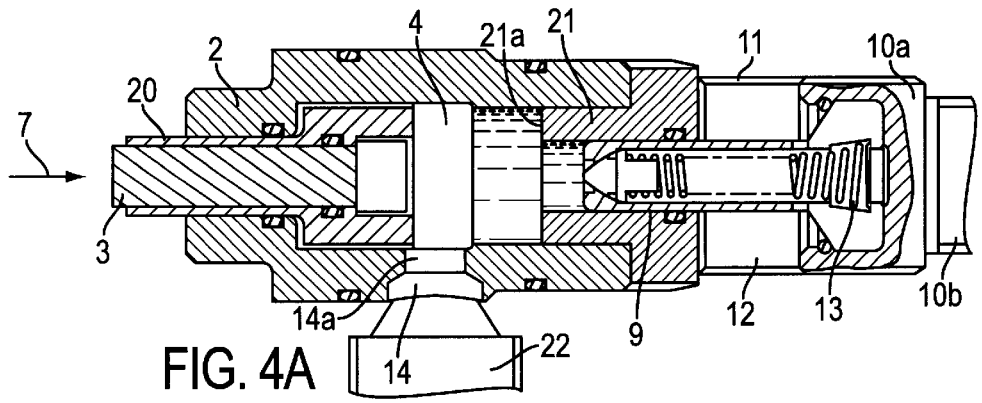
FIGS. 4a, 4b, 4c and 4d are axial sectional views of the construction of FIG. 3 shown in different operational positions when air is delivered.

FIG. 4a shows the operational state of the lubricator shortly before completion of the suction phase during which, for example, because the grease container 22 was replaced, air was drawn into the work chamber 4. The check valve 13 disposed in the adjusting abutment 9 is in its closed position during such an occurrence.

Figure 4B:
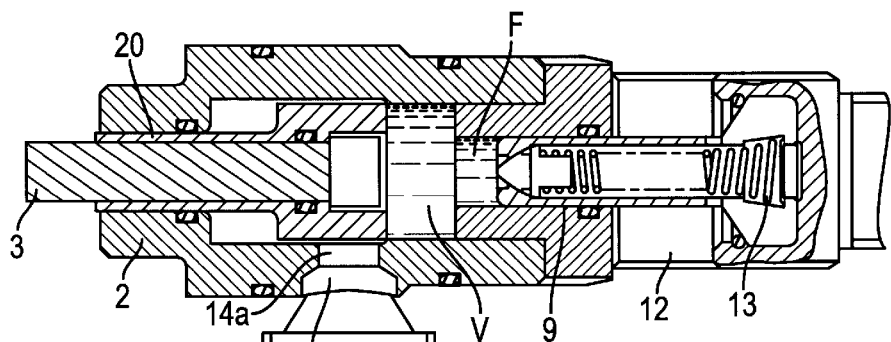
Figure 4C:
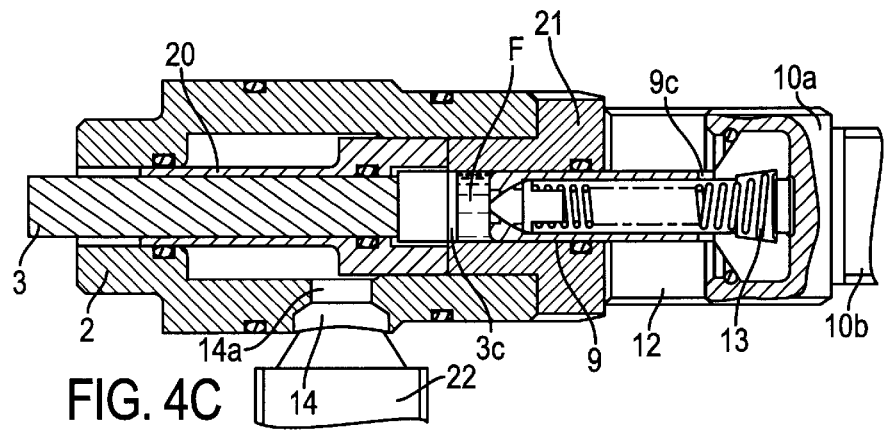

Also reverting to FIG. 3, upon pressurization of the additional work chamber 6, the delivery piston 3 and the external piston 20 move towards the right in the delivery direction; during this occurrence first the opening 14a of the supply port 14 is closed by the external piston 20 as shown in FIG. 4b. The drawn-in air is accordingly enclosed in the portions V and F since the check valve 13 continues to assume its closed position. Since both pistons 3 and 20 first continue their motion in the delivery direction (arrow 7), the enclosed air is compressed during such an occurrence. Subsequently the external piston 20 engages the limit surface 21a and the delivery piston 3 reaches the beginning of the delivery portion F. Accordingly, the compressed air then only takes up a volume which corresponds to the delivery portion F (FIG. 4c). As a condition for the above-outlined occurrences the compressing force which drives the external piston 20 is so dimensioned that the external piston 20 may arrive into engagement with the limiting surface 21a against the resistance of the compressed air.

Figure 4D:
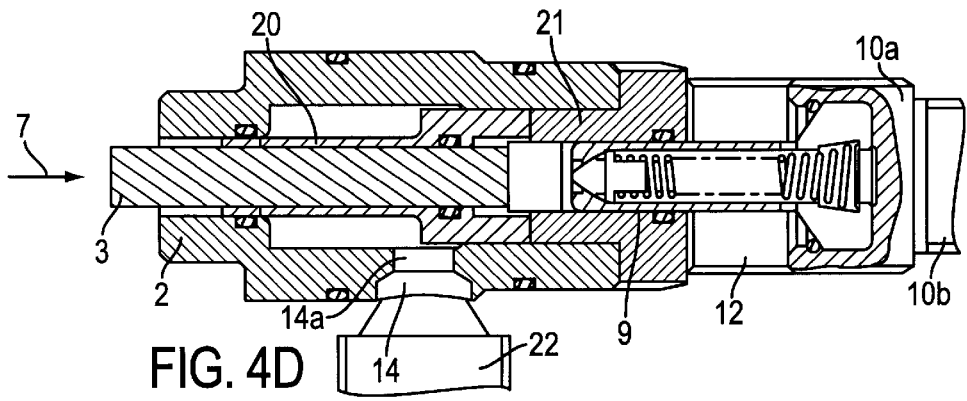

Since the driving force which is applied to the delivery piston 3 is—as noted earlier—greater than the compressing force derived from the external piston 20, the delivery piston 3 may continue its delivery stroke in the delivery portion F. The associated pressure increase within the delivery portion F causes the check valve 13 to move into its open position and the compressed air is displaced through the adjusting abutment 9 into the delivery port 12. During this occurrence the delivery piston 3 continues its motion in the delivery direction until it has arrived into engagement with the adjusting abutment 9 and the delivery portion F has assumed at least approximately a "zero" volume (FIG. 4d)

The operation of the lubricator shown in FIG. 3 during grease delivery will be described below in conjunction with FIGS. 5a–5d.

Figure 5A:
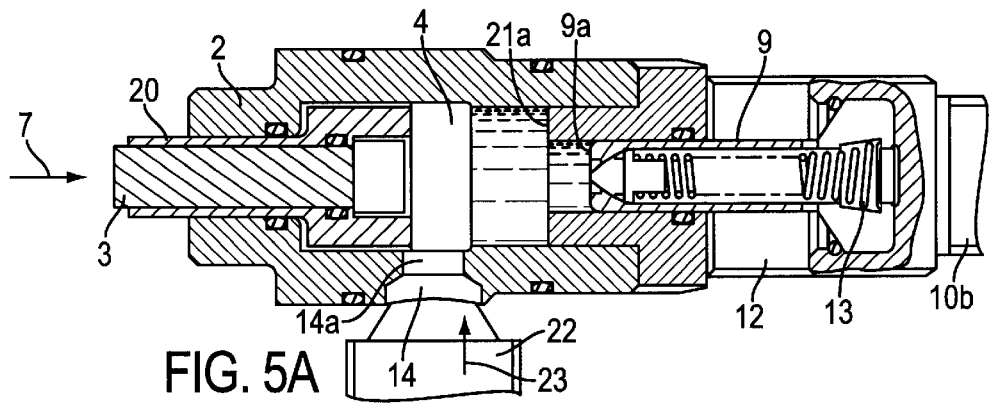
FIGS. 5a, 5b, 5c and 5d are axial sectional views of the construction of FIG. 3 shown in different operational positions when lubricating grease is delivered.

During the suction phase shown in FIG. 5a, grease is drawn from the grease container 22 through the supply port 14 into the work chamber 4 as a result of the motion of the pistons 3 and 20, while the check valve 13 in the adjusting abutment 9 assumes its closed position. The inflow of the grease into the work chamber 4 is designated with the arrow 23.

Figure 5B:
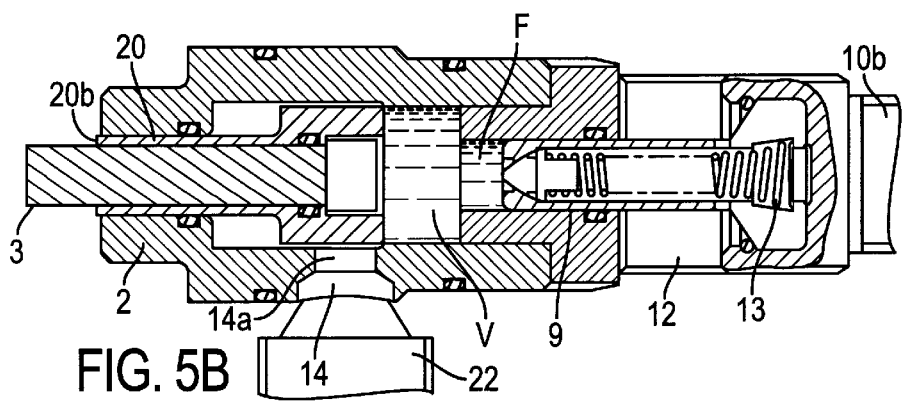

By pressurizing the additional work chamber 6 (FIG. 3), the pistons 3 and 20 move towards the right in the delivery direction as indicated by the arrow 7, as a result of which first the supply port opening 14*a* is closed by the external piston 20 as seen in FIG. 5*b*. Accordingly, grease is present only in the portions V and F of the work chamber 4. Since the compressing force applied by the external piston 20 is set to be smaller than the driving force displacing the delivery piston 3, the external piston 20 may not continue its motion in the delivery direction against the force of the incompressible grease in contrast to the delivery piston 3. The continued motion of the latter until its entrance into the delivery portion F has the result that in the region of the compressing portion V grease is displaced since the check vale 13 continues to be closed. Accordingly, the external piston 20 is pushed back opposite the delivery direction 7 and during such a motion, it frees the opening 14*a* of the supply port 14, so that by virtue of the displacing effect of the delivery piston 3 grease is returned in the direction of the supply port 14 and the grease container 22, as shown in FIG. 5*c*.

Figure 5C:
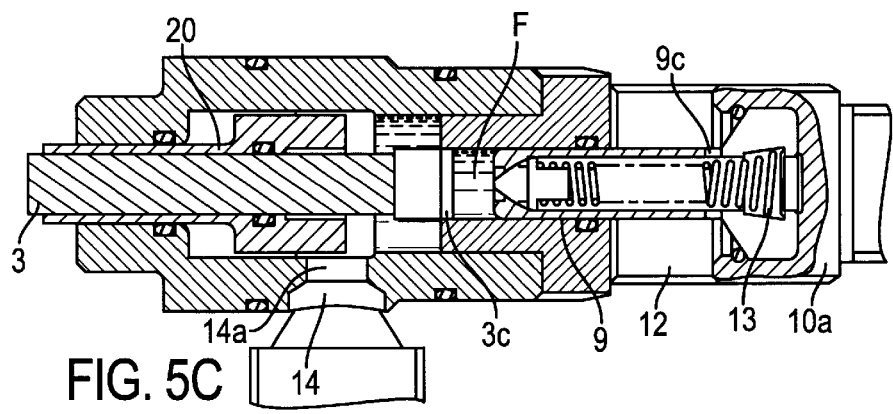
Figure 5D:
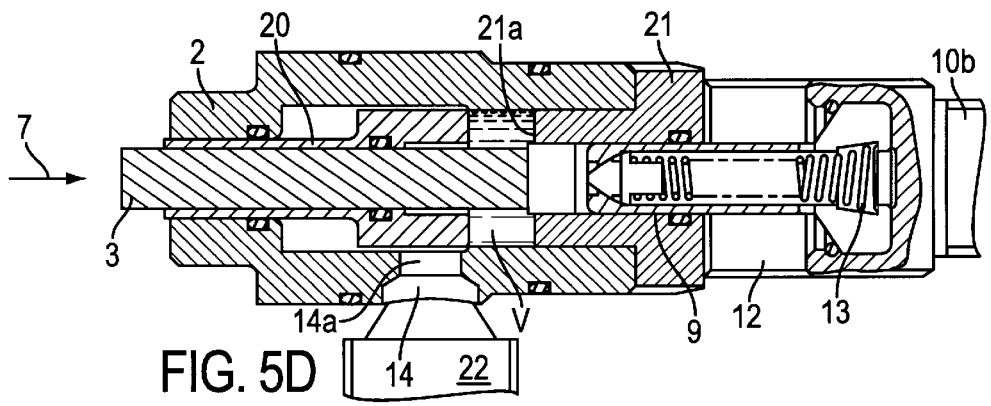

As soon as the delivery piston 3 has closed off the delivery portion F from the compressing portion V as seen in FIG. 5*c*, the continuing delivery stroke of the delivery piston 3 and the thus-increased pressure level in the incompressible grease results in a pressure level prevailing in the delivery portion F that is greater than the closing force set for the check valve 13. Therefore, the check valve 13 is moved into its open position, as a result of which the delivery piston 3 may displace the grease, present in the delivery portion F, in the direction of the delivery port 12 as seen in FIG. 5*d*. Such a delivery process is performed until the delivery piston 3 eventually arrives into engagement with the adjusting abutment 9 and the volume of the delivery portion F is at least approximately reduced to "zero". As a result of the continued delivery stroke of the delivery piston 3 after blocking off the delivery portion F from the compressing portion V, no displacement takes place any longer in the region of the compressing portion V. As a consequence, the external piston 20 eventually again assumes its position shown in FIG. 5*d* in which the opening 14*a* of the supply port 14 is at least approximately closed off by the external piston 20 from the compressing portion V.

In the embodiment illustrated in FIGS. 3, 4*a*–4*d* and 5*a*–5*d*, the external piston 20 also constitutes an additional device (grease return device) by means of which, triggered by a sufficiently high pressure level in the compressing portion V present only during grease delivery, an otherwise blocked return connection between the compressing portion V and the return port 14 may be established, as long as the head 3*c* of the delivery piston 3 is situated in the compressing portion V during its delivery stroke.

Figure 6:
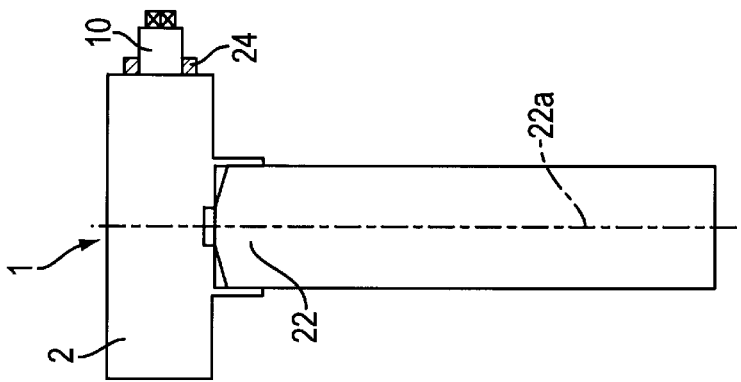
FIG. 6 is a side elevational view of a lubricator with an associated lubricating grease container.

FIG. 6 schematically shows the lubricator 1 and the lubricant container 22 attached thereto and also shows that the adjusting pin 10 of the adjusting abutment 9 is tightened to the lubricator housing 2 by a securing nut 24 to thus secure the adjusting abutment 9 against undesired rotation.

The grease container 22 is preferably a commercially available grease cartridge which may be screwed to the supply port (as shown in FIG. 3) without the need of tools. The jacket of the cartridge may be of flexible material which, as the emptying of the container is in progress, collapses in the direction of its longitudinal axis 22*a* and thereby indirectly shows the degree of fill.

As an alternative, the grease container (cartridge) 22 may be provided with a bottom displaceable parallel to the longitudinal axis 22*a* and may be of a transparent material so that the position of the cartridge bottom is readily visible through the cartridge wall and thus gives an easy indication of the degree of fill.

Figure 7A:
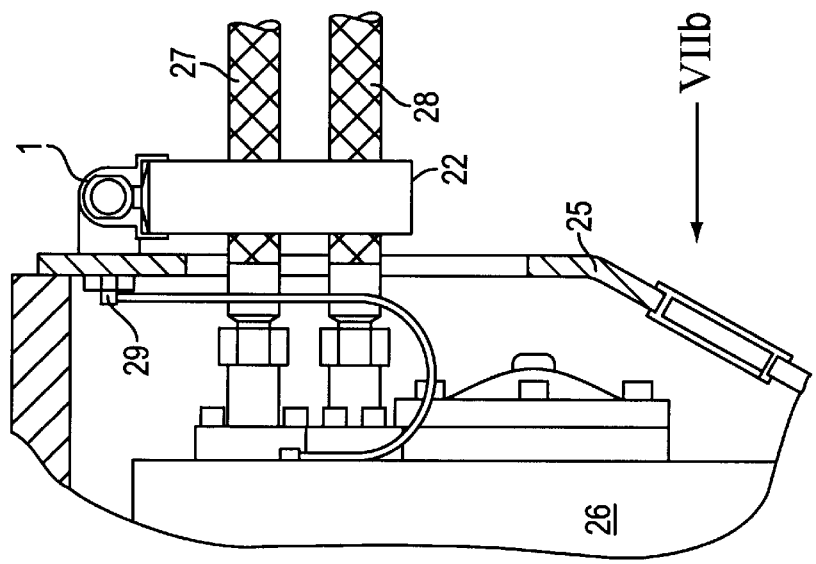
FIG. 7a is a fragmentary sectional side elevational view of a hydraulic hammer tool carrying on its housing a lubricating grease supply device (lubricator and lubricant container) according to the invention.
Figure 7B:
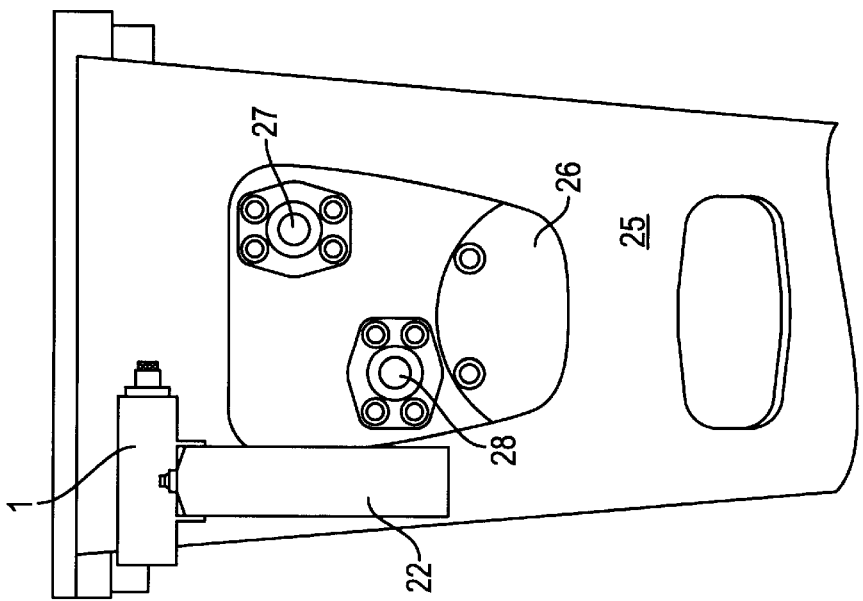
FIG. 7b is a fragmentary front elevational view of the structure shown in FIG. 7a as viewed in the direction of the arrow 7b.

FIGS. 7*a* and 7*b* show an example of application in which the lubricator, together with the grease container 22 (for example, a commercially available cartridge as noted earlier) is secured to an outer housing 25 of a hydraulic hammer 26. The latter is, in a known manner, connected by a pressure line 27 and a depressurized return line 28 to a non-illustrated hydraulic aggregate. Further, there is schematically shown a conduit system 29 which couples the lubricator 1 with the hydraulic hammer 26. The conduit system (which includes two separate, non-illustrated individual conduits) serves, on the one hand, to supply the lubricator 1 with driving energy and, on the other hand, couples the delivery port 12 (as shown, for example, in FIGS. 1*a* and 1*b*) to the lubricating location of the hydraulic hammer 26 to be supplied with lubricating grease.

The advantage achieved by the invention resides in that with simple means and in a reliable manner an undesired compressible medium (normally air) may be eliminated from the region of the grease container and the supply port after such compressible medium has been drawn into the work chamber of the lubricator. In this manner operational disturbances and damage to the construction machine served by the lubricator according to the invention may be avoided which may otherwise occur in case the lubricator does not supply the lubricating locations with grease in the intended manner.

The invention also relates to a method for supplying grease to construction machines. The method is characterized in that first a larger volume of a compressible or incompressible medium is drawn into the work chamber of the lubricator and—independently from the compressibility of the medium—with each delivery stroke of the delivery piston a determined delivery volume is further conveyed outwardly which is less than the volume that has been previously drawn in. Accordingly, the process according to the invention is, in case of handling an incompressible medium, so designed that one part of the incompressible medium which is first drawn into the work chamber is, before introducing the delivery process proper, returned outwardly from the work chamber. For this purpose, the closure element cooperating with the delivery port must be designed such that it is opened only after a return delivery has taken place.

It will be understood that the above description of the present invention is susceptible to various modifications, changes and adaptations, and the same are intended to be comprehended within the meaning and range of equivalents of the appended claims.

What is claimed is:

1. In a grease lubricator including a work chamber having a length and being defined by a chamber wall extending along said length;

a delivery piston accommodated in said work chamber for executing delivery strokes and return strokes therein; said delivery piston having a delivery piston head;

first driving means for causing said delivery piston to execute said delivery strokes and said return strokes;

a supply port connectable to a grease container and having a supply port opening provided in said chamber wall; said supply port merging into said work chamber through said supply port opening and being closable by said delivery piston during the delivery strokes thereof;

a delivery port connectable to a machine location to be lubricated and having a delivery port opening through which said delivery port merges into said work chamber; said delivery port opening being situated downstream of said supply port opening as viewed in a direction of said delivery strokes;

a closure element having open and closed positions for respectively establishing and interrupting communication between said work chamber and said delivery port;

biasing means for resiliently maintaining said closure element in said closed position; and an adjusting abutment situated at an end of said work chamber and limiting a length of said delivery strokes;

the improvement comprising (a) a compressing portion forming a length portion of said work chamber and being situated downstream of said supply port opening;

(b) a delivery portion forming a length portion of said work chamber and adjoining said compressing portion downstream thereof; said compressing portion having a diameter greater than a diameter of said delivery portion;

(c) grease return means for returning grease from said compressing portion into said supply port; said grease return means including blocking means for maintaining communication between said compressing portion and said supply port solely as long as said delivery piston head is situated in said compressing portion during the delivery strokes and a sufficiently high pressure prevails in said compressing portion;

(d) biasing means for resiliently maintaining said closure element in said closed position; said biasing means having a biasing force set such that said closure element assumes said open position from said closed position at the earliest when said delivery piston head, during the delivery stroke, has reached said delivery portion and has blocked off said delivery portion from said compressing portion;

(e) a limiting face situated in said work chamber and separating said compressing portion from said delivery portion;

(f) a holding element attached to said delivery piston;

(g) an external piston forming part of said grease return means; said external piston being situated in said work chamber and being displaceable relative to said delivery piston along a path limited by said limiting face and said holding element; and (h) second driving means for causing said external piston to execute strokes in a direction of said delivery strokes of said delivery piston; a force applied by said second driving means to said external piston being less than a force applied by said first driving means to said delivery piston; the force of said second driving means being set such that said external piston overcomes a pressure derived from a compressible medium in said work chamber to arrive into engagement with said limiting face.

2. The lubricator as defined in claim 1, wherein said first driving means comprises (a) means for applying fluid pressure to said delivery piston externally of said work chamber to cause said delivery piston to execute said delivery strokes; and (b) a mechanical return means exerting a force to said delivery piston to cause said delivery piston to execute said return strokes.

3. The lubricator as defined in claim 1, wherein said closure element comprises a spring-biased check valve.

4. The lubricator as defined in claim 1, wherein said delivery portion is defined by a delivery portion wall and further wherein said closure element directly forms a part of said delivery portion wall upstream of said delivery port, whereby said delivery portion has an at least approximately zero volume when said delivery piston is in engagement with said adjusting abutment.

5. The lubricator as defined in claim 1, wherein said delivery port opening is situated in said delivery portion and is provided in said adjusting abutment.

6. The lubricator as defined in claim 5, wherein said adjusting abutment has an end face defining an end of said delivery portion; said closure element forming a portion of said end face in said closed position.

7. The lubricator as defined in claim 1, wherein said first and said second driving means comprise a common hydraulic driving means applying hydraulic pressures to said delivery piston and said external piston externally of said work chamber.

* * * * *